Feb. 16, 1926.
B. D. SAKLATWALLA ET AL
1,573,095
POWER CONTROL
Filed April 24, 1919 4 Sheets—Sheet 1
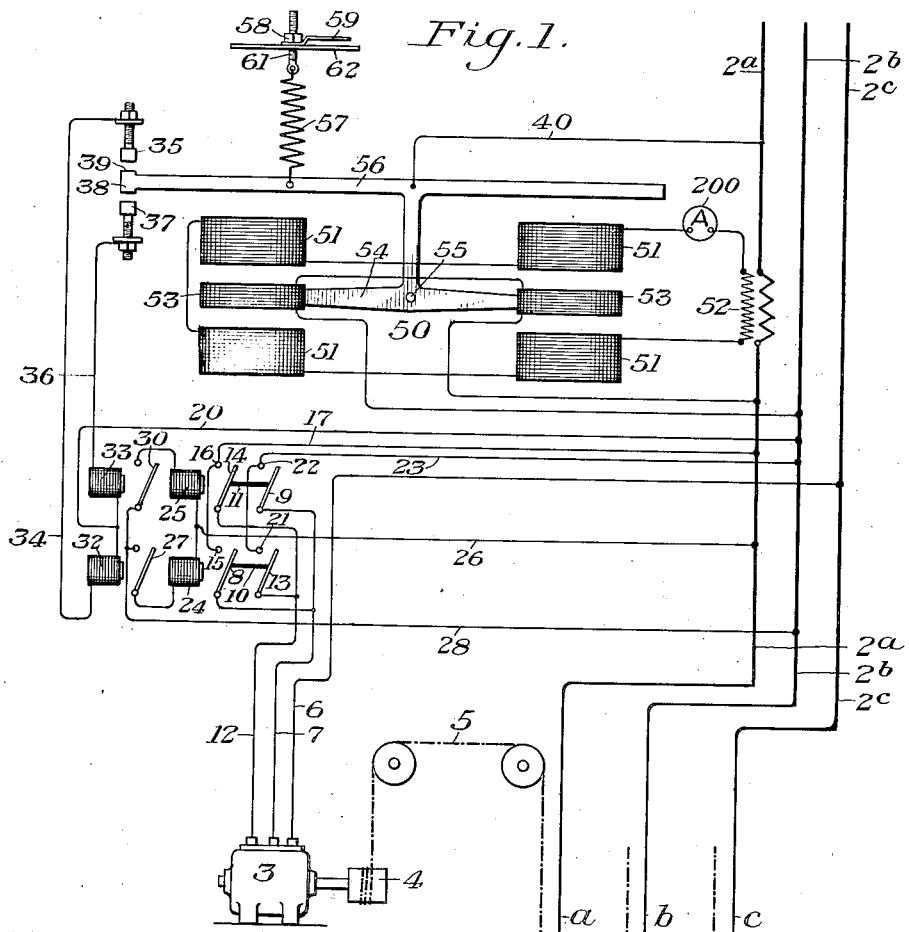
Fig. 1.
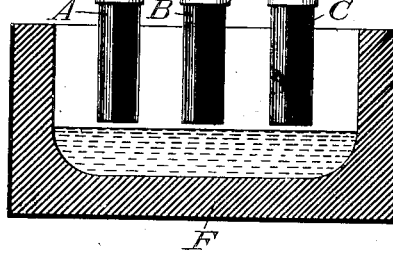
Fig. 1ª
WITNESSES
INVENTORS

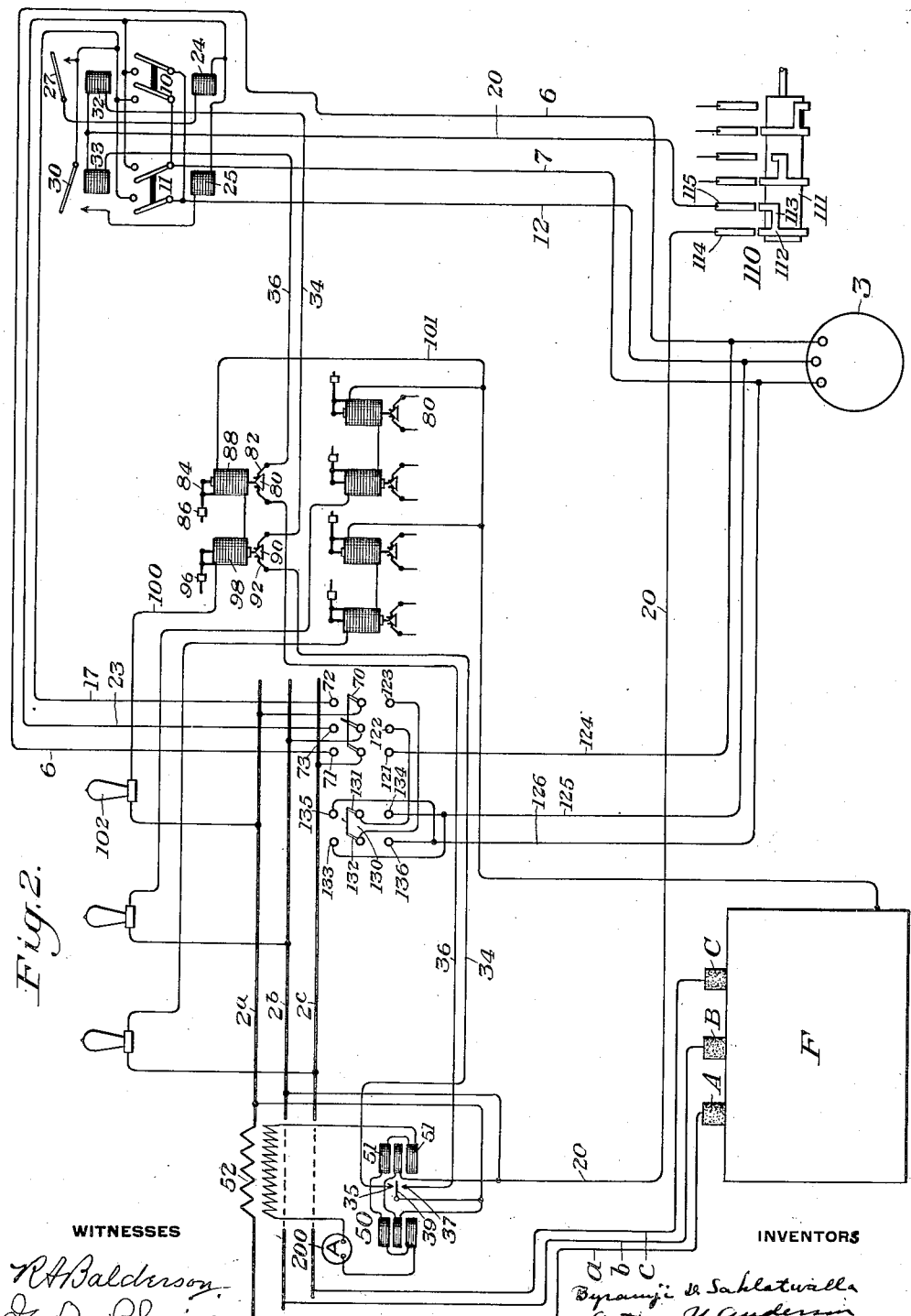

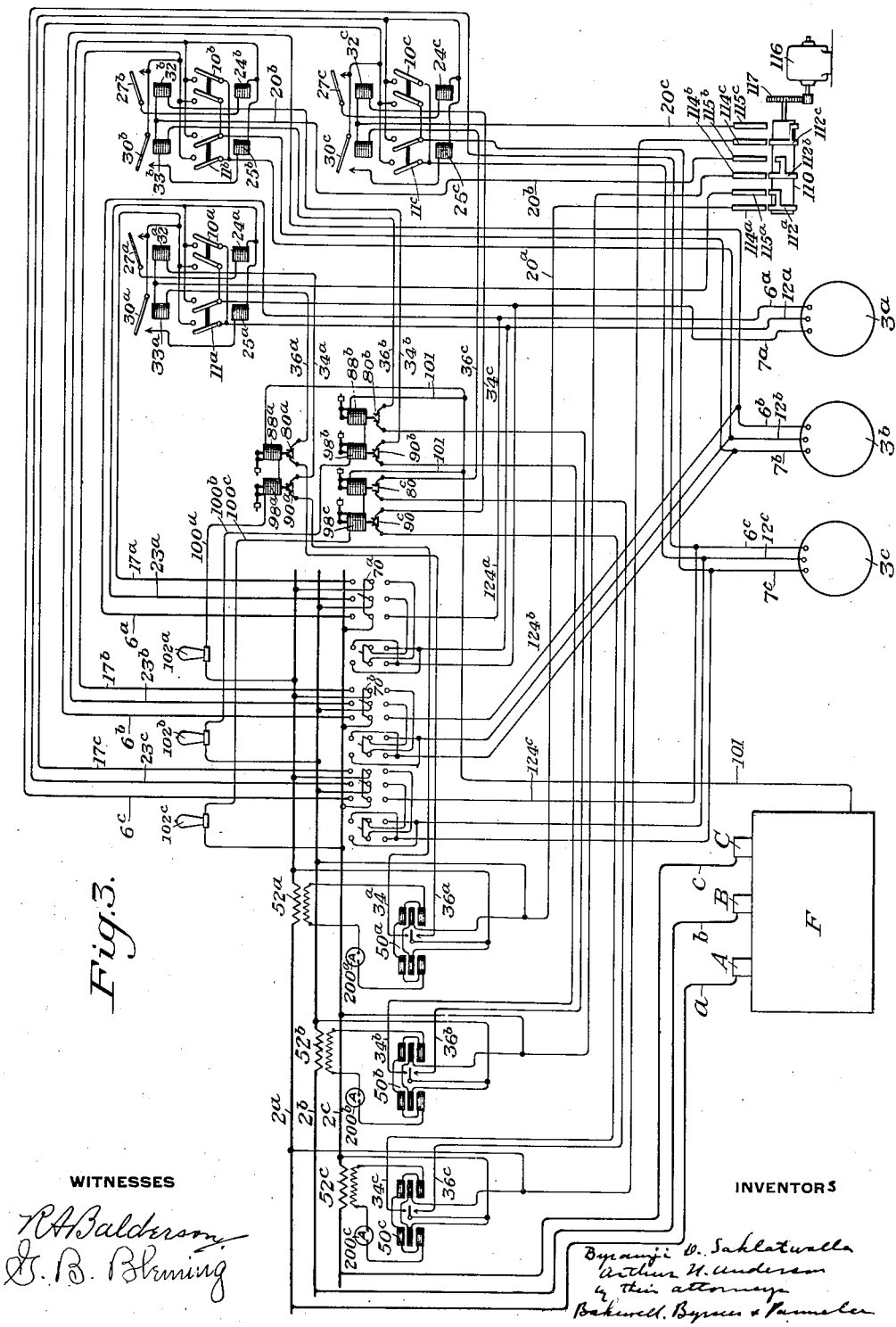

Feb. 16, 1926. 1,573,095
B. D. SAKLATWALLA ET AL
POWER CONTROL
Filed April 24, 1919 4 Sheets-Sheet 4
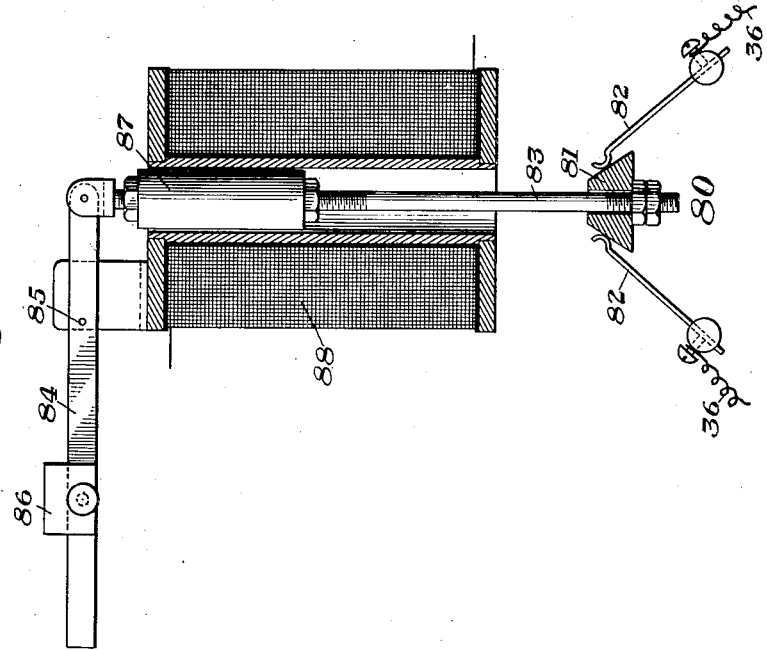
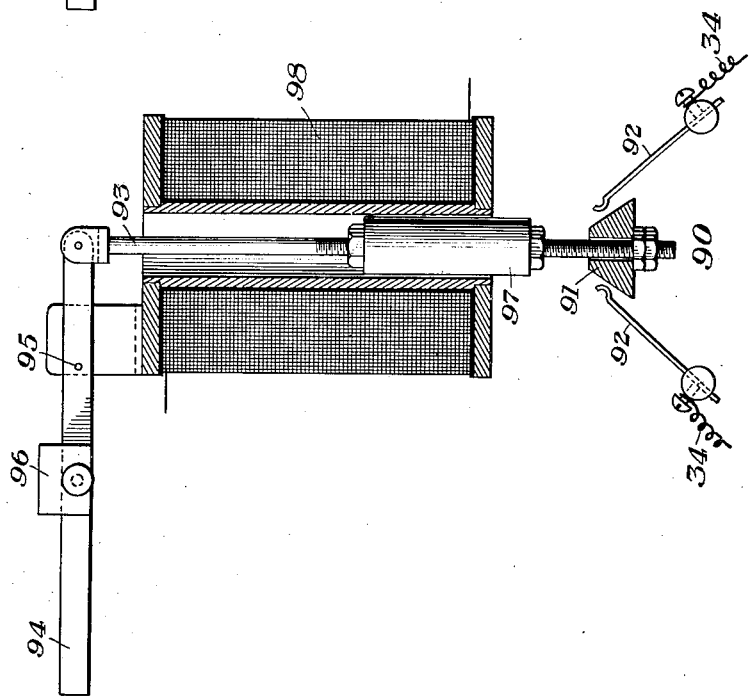
WITNESSES
INVENTORS Patented Feb. 16, 1926.

1,573,095

UNITED STATES PATENT OFFICE.

BYRAMJI D. SAKLATWALLA AND ARTHUR N. ANDERSON, OF CRAFTON, PENNSYLVANIA, ASSIGNORS, BY MESNE ASSIGNMENTS, TO VANADIUM CORPORATION OF AMERICA, OF NEW YORK, N. Y., A CORPORATION OF DELAWARE.

POWER CONTROL.

Application filed April 24, 1919. Serial No. 292,286.

*To whom it may concern:*

Be it known that we, BYRAMJI D. SAKLATWALLA, a subject of the British Empire, residing at Crafton, in the county of Allegheny and State of Pennsylvania, and ARTHUR N. ANDERSON, a citizen of the United States, residing at Crafton, in the county of Allegheny and State of Pennsylvania, have invented a new and useful Improvement in Power Controls, of which the following is a full, clear, and exact description, reference being had to the accompanying drawings, forming part of the specification, in which—

Figure 1 is a schematic view.

Figure 1ª is a detail view of the adjusting dial.

Figure 2 is a wiring diagram for the connections for one motor.

Figure 3 is a wiring diagram showing the connections for all three motors.

Figure 4 is a vertical section through one of the limit switches, and

Figure 5 is a vertical section through the other limit switch.

The present invention relates to power control, and more particularly to the control of the power supply to a power consuming device. The present system of control is particularly applicable to electric apparatus for the production of thermal, electro-chemical, or mechanical energy such, for example, as electric furnaces, electrolytic cells and electric motors for varying loads such, for example, as a motor driving a grinder.

The electric controls for such devices have generally effected regulation by controlling one of the several electrical factors involved, although all such factors enter together into the electrical energy actually consumed, namely, amperage and voltage in direct current, and amperage, voltage, power factor and frequency in alternating current. The result has been that in spite of one factor being controlled (usually the amperage), variations in other factors have detrimentally effected the operation of the current consuming device resulting in uneven operation, loss of power or low load factor. Furthermore, the sensitiveness of such controlling systems has generally been low, the control being usually effected at certain fixed points only, between which no regulation was possible.

Fluctuations in the several factors of the power consumed may arise in different ways. For example, in an electrical power consuming device the transmission line supplying the power may cause variations in the electrical factors as well as the apparatus itself. It is well known that industries using electric power, and especially those located at some distance from the generating station, are frequently subjected to annoyances by voltage variations, and in the case of alternating currents, by variations in frequency in the transmission lines. Such variations may materially affect the efficient application of the power consumed. In the case of electric furnaces, for example, the power applied should be constant or varied only by the operator to meet changing conditions in the furnace.

The object of the invention is to provide a control by which the power can be accurately controlled or regulated, and in case of electrical apparatus, to provide a control by which the actual sum total electrical energy in effective watts may be accurately controlled or regulated in the electric power consuming apparatus irrespective of the variations occurring in such apparatus or occurring in the transmission lines supplying the power.

Another object of the invention is to provide a control whereby each of the power-using units, such as the electrodes of an electric furnace, may receive its proper proportion of the power, and whereby such proportional distribution among the several units may be automatically maintained under the varying conditions to which such units are subjected.

The invention is illustrated as embodied in an electric arc smelting furnace in which the electrodes are automatically raised or lowered to maintain the power consumption of the furnace substantially constant irrespective of the changes taking place in the furnace and irrespective of the variations of voltage or frequency, or both, in the incoming transmission lines.

Referring to the illustrated embodiment of the invention; Figure 1 is a schematic view showing the principles of the control system as applied to one of the furnace electrodes. The electric furnace F is of the arc type, and is provided with three electrodes A, B and C, projecting down into the furnace chamber in which is the ore or other material to be smelted. The electrodes A, B and C are connected respectively by leads $a$, $b$ and $c$ with the bus bars $2^a$, $2^b$ and $2^c$, which are fed by a three phase alternating electric current generator (not shown), which may feed the bus bars over a long transmission line. Each of the electrodes A, B and C, is raised or lowered by electrically controlled mechanism, shown in the present instance as a three phase electric motor 3 driving a pulley 4 around which is wound a rope 5, suspending the electrode in the furnace.

In Figure 1 is illustrated one motor connected with one of the electrodes and one system of circuits and devices for controlling such motor, but it will be understood that a motor is provided for each of the three electrodes and the system of circuits and controlling devices is duplicated for the several motors.

One terminal of the motor 3 is directly connected by a lead 6 to one of the bus bars, say the bus bar $2^c$. The second terminal on the motor is connected through a lead 7 to the blades 8 and 9 of two double pole single throw switches 10 and 11 respectively. The third terminal of the motor is connected through a lead 12 to the blades 13 and 14 of the respective switches 10 and 11. The stationary contacts 15 and 16 of these switches are connected through the lead 17 to the bus bar $2^a$, while the stationary contacts 21 and 22 are connected through a lead 23 to the bus bar $2^b$. These connections are such that if the switch 10 is closed, the motor leads 7 and 12 are connected with the bus bars $2^a$ and $2^b$ respectively, and when the switch 11 is closed, the connections are reversed, the motor leads 7 and 12 being connected with the bus bars $2^b$ and $2^a$ respectively. This reversal of the motor connections to the bus bars serves to reverse the rotation of the motor, the motor running to raise the electrode A when the switch 11 is closed, and running in the opposite direction to lower the electrode when the switch 10 is closed.

The switches 10 and 11 are respectively actuated by electromagnets 24 and 25. The adjacent terminals of the magnet coils are connected together and through a common lead 26 to the bus bar $2^a$. The other terminal of the coil of magnet 24 is connected through a relay switch 27 and the lead 28 to the bus bar $2^b$, while the other terminal of the coil of the magnet 25 is connected through a relay switch 30 and the lead 28 to the bus bar $2^b$.

When the relay switch 27 is closed, the magnet 24 is energized to close the switch 10, and when the relay switch 30 is closed the magnet 25 is energized to close the switch 11. The relay switches 27 and 30 are actuated by electromagnets 32 and 33, respectively. The adjacent terminals of the coils of the magnets 32 and 33 are connected together and through the common lead 20 to the bus bar $2^b$. The other terminal of the relay magnet 32 is connected through the lead 34 to the upper adjustable stationary contact 35 and the other terminal of the relay magnet 33 is connected through the lead 36 to the lower and opposite stationary contact 37 of a switch 38 having a movable contact 39, which is connected through a lead 40 to the bus bar $2^a$.

The movable contact 39 is carried by the tilting element of a watt actuated device indicated generally by reference numeral 50. This is illustrated as a Kelvin balance having fixed current coils 51 connected through a current transformer 52 to the bus bar $2^a$, and having movable potential coils 53 connected across between the bus bars $2^a$ and $2^b$. The potential coils 53 are carried on a tilting lever 54 pivoted at 55, upon which is mounted the arm 56 which carries the movable switch contact 39. A spring 57 is connected with the arm 56 tending to draw it upward. The tension of the spring may be adjusted by means of a nut 58 carrying a pointer 59 movable over a calibrated dial scale 60. The nut 58 is threaded on a screw stud 61 which is movable through the stationary dial plate 62.

The several coils 51 and 53 of the Kelvin balance are so wound that when current flows through the bus bar $2^a$, the left hand potential coil as viewed in Figure 1, will be attracted by the lower current coil and repulsed by the upper current coil, while the right hand potential coil will be attracted by the upper current coil and repulsed by the lower current coil, so that the arm 56 will be pushed down against the tension on the spring 57, as will be readily understood by one skilled in this art.

The magnetic fields of the coils of the Kelvin balance are, of course, iron-free so that the magnetic forces between the coils are accurately proportional to the wattage.

The dial scale 60 is preferably calibrated to read directly in kilowatts so that the tension of the spring 57 will just balance the magnetic thrust of the Kelvin balance coils when the bus bar $2^a$ is delivering to the electrode A the number of kilowatts indicated by the pointer 59 and the movable contact 39 will be suspended midway between the stationary contacts 35 and 37.

One of the well known characteristics of a Kelvin balance type of watt meter is that it is not substantially affected by external stray fields, since such fields act equally and in the same direction on the coils on the two ends of the balance. This characteristic of the Kelvin balance type of watt meter is particularly valuable on switch boards or any other localities subject to external electric fields.

An ammeter 200 is shown interposed in the secondary of the current transformer 52 to indicate the current consumed by the electrode A.

The operation of the apparatus as shown in Figure 1 is as follows:—The pointer 59 is set to indicate the number of kilowatts which it is desired to be delivered to the electrode A. If, for any reason, a greater wattage is being delivered to the electrode, the Kelvin balance 50 will draw down the arm 56 against the tension of the spring 57, bringing the movable contact 39 against the lower stationary contact 37, and completing the circuit through the relay magnet 33 to close the relay switch 30. The relay switch 30 closes the circuit through the magnet 25 which thereupon closes the switch 11 and causes the motor to be driven in a direction to raise the electrode A, thus increasing the length of the arc and its resistance and thereby reducing the current through the bus bar $2^a$. When the electrode is raised sufficiently to reduce the wattage to that predetermined by the dial setting, the Kelvin balance resumes its neutral position with the movable contact 39 out of contact with the stationary contacts 35 and 37. If the watts delivered to the electrode A fall below that indicated by the dial setting, the Kelvin balance will move in the opposite direction under the tension of the spring to bring the movable contact 39 against the upper stationary contact 35, completing the circuit through the relay 32 to close the switch 10 and causes the motor to be driven in the opposite direction to lower the electrode A and thereby increase the current consumed by the electrode. In actual practice, the Kelvin balance 50 is continually vibrating back and forth and the motor 3 is turning to keep the wattage at the predetermined point. The other two electrodes B and C are similarly adjusted in position to maintain a constant wattage for the current consumed by them by controlled systems duplicating that of the control system of the electrode A.

The regulation may be equally well applied to direct current lines in which case the transformer 52 would be replaced by a resistance to which the current coils of the watt meter would be connected in shunt.

The regulator, and particularly, the regulator illustrated, may also be employed for amperage or voltage regulation alone. For amperage regulation the coils of the Kelvin balance would all be arranged in series and connected with the current transformer 52. For voltage regulation the coils would likewise be arranged in series, but wound with fine wire and connected across between two of the bus bars.

The wiring diagram of the regulating system for one electrode motor is shown in Figure 2 and that for the three electrode motors in Figure 3.

Referring first to Figure 2 on which the reference characters indicate the parts designated by the same characters in Figure 1:— The furnace F has electrodes like those shown in Figure 1, one of which is raised or lowered by the motor 3 through any suitable connections such as shown in Figure 1, for example. The motor has three leads, 6, 7, and 12. The lead 6 is connected to the contact 71 of a double throw three pole hand switch 70, which, when thrown up, connects the lead 6 to the bus bar $2^c$. The leads 7 and 12 are connected to the switches 10 and 11 which are in turn connected with the bus bars $2^a$ and $2^b$ through the leads 17 and 23 and the contacts 72 and 73 of the switch 70 when it is thrown upwardly. The switches 10 and 11 are actuated by the magnets 24 and 25, respectively, which are controlled by the relay switches 27 and 30, respectively, which in turn are controlled through the magnets 32 and 33 and the connections 34 and 36 by the Kelvin balance, substantially as has been described in connection with Figure 1.

In Figure 3 is illustrated the connections for controlling three motors, one for each of the electrodes. The connections for each motor are the same as those shown for the single motor in Figure 2. The corresponding reference numerals in Figure 3 refer to the same parts as in Figure 2, the suffixes "a", "b" and "c" being used to indicate the parts of the motor control systems for the three electrodes A, B and C, respectively.

Referring to Figure 3, the three motors $3^a$, $3^b$ and $3^c$ are connected to raise or lower three furnace electrodes, A, B and C by any suitable mechanical connection, such for example as the rope and pulley shown in Figure 1. The motors $3^a$, $3^b$ and $3^c$ are each provided with a regulating system including the Kelvin balance $50^a$, $50^b$ and $50^c$ respectively. Each Kelvin balance controls its respective motor through a system of relay and motor circuit switches, the three sets of switches being indicated at the upper right hand part of Figure 3, the parts corresponding to those shown in Figure 2, with the suffixes "a", "b" and "c" added to indicate to what particular motor they appertain.

Referring to Figure 2, two so-called limit switches 80 and 90 are interposed in the leads 34 and 36, respectively, these being the leads from the stationary contacts of the Kelvin balance to the relay magnets 33 and 32. These limit switches 80 and 90 are connected to be controlled by the potential across the arc from the electrode to the molten bath of metal in the furnace, and operate to open circuit the connections 36 and 34, respectively, in case this potential exceeds or falls below certain predetermined limits. This results in preventing the motor from raising the electrode in case of an abnormal increase in the potential drop across the arc, or lowering the electrode in case of an abnormal decrease in the potential drop across the arc The structure of these switches is shown in detail in Figures 4 and 5. The switch 80, which may be designated as the high voltage switch, comprises a vertically movable contact block 81 which, when drawn upwardly, bridges across the two stationary spring contacts 82 which are interposed in the circuit 36. The contact 81 is carried on the lower end of a rod 83 hung at its upper end from a lever 84 pivoted at 85 and provided with an adjustable counter weight 86. On the rod 83 is a plunger 87 which is arranged to be drawn upwardly when the magnet coil 88 is sufficiently energized. The weight 86 is adjusted along the arm 84 so as to maintain the switch closed against the downward attraction of the plunger 87 by the magnet 88 under normal voltage conditions. The switch 90, which may be designated as the low voltage switch, has a movable contact 91 bridging the stationary contacts 92 of the circuit 34 and carried on the lower end of a rod 93 hung from its upper end from a lever 94, pivoted at 95 and having the adjustable counter weight 96. The rod 93 carries the plunger 97 which, in the case of this magnet, is located at the lower end of the rod so that when the magnet coil 98 is sufficiently energized the plunger 97 will be drawn upwardly and close the switch. The weight 96 on this switch is adjusted so that for normal voltages the pull of the magnet on the plunger is sufficient to maintain the switch closed.

The magnets 88 and 98 of the limit switches 80 and 90 respectively, are connected in series and are connected by a lead 100 through an incandescent lamp 102 to the bus bar $2^a$ and by a lead 101 to the furnace F. The connection to the furnace is made through the furnace casing to the body of molten metal in the furnace.

Each of the motors $3^a$, $3^b$ and $3^c$ is provided with a pair of high and low voltage limit switches indicated at $80^a$ and $90^a$, $80^b$ and $90^b$, $80^c$ and $90^c$, respectively, in Figure 3. The limit switches $80^a$ and $90^a$ are interposed in the leads $36^a$ and $34^a$ from the Kelvin balance $50^a$ to the magnets of the relay switches $30^a$ and $27^a$. The limit switches $80^b$ and $90^b$ are interposed in the leads $36^b$ and $34^b$ from the Kelvin balance $50^b$ to the magnets of its relay switches $30^b$ and $27^b$, and the limit switches $80^c$ and $90^c$ are interposed in the leads $36^c$ and $34^c$ from the Kelvin balance $50^c$ to the magnets of its relay switches $30^c$ and $27^c$. The magnets of the limit switches $80^a$ and $90^a$ are connected through the lead $100^a$ and the lamp $102^a$ to the bus bar $2^a$. The magnets of the limit switches $80^b$ and $90^b$ are connected through the lead $100^b$ and the lamp $102^b$ to the bus bar $2^b$. The magnets of the limit switches $80^c$ and $90^c$ are connected through the lead $100^c$ and the lamp $102^c$ to the bus bar $2^c$. The three sets of limit switches have a common connection 101 to the furnace F, this connection going through the furnace casing to the body of molten metal within the furnace.

The three electrodes A, B and C with their leads $a$, $b$ and $c$, form a star or Y connection between the bus bars $2^a$, $2^b$ and $2^c$ of the three phase supply system. The molten metal in the furnace is the center or junction point of this Y connection. The leads $100^a$, $100^b$ and $100^c$ also form a star or Y connection between the bus bars $2^a$, $2^b$ and $2^c$ and the molten metal in the furnace. As can readily be seen, the limit switches $80^a$ and $90^a$ in the leg $100^a$ of the Y connection are connected across the arc between the electrode A and the body of metal in the furnace, so as to be controlled by the potential drop across this arc. Similarly the limit switches $80^b$ and $90^b$, $80^c$ and $90^c$ are respectively connected in shunt with the arcs from the electrodes B and C to be controlled by the potential drop across such arcs.

The lamps $102^a$, $102^b$ and $102^c$ serve as non-inductive resistances for their respective limit switches and also serve as visual indications of the potential drops across the three furnace arcs.

The operation of the limit switches is as follows:—The weights on the lever arms of the several limit switches are so adjusted that when the arcs in the furnace are properly balanced and there are substantially equal voltage drops across the three arcs, all of the limit switches will be maintained closed. The weights are usually adjusted to allow a few volts variation either way from an equally balanced voltage drop across the three arcs. Suppose, however, that for some reason such as an abnormal increase in the resistance of the arc of the electrode A, the potentials across the arcs become unbalanced, the potential across the arc of the electrode A materially exceeding the potential across the arcs of the electrodes B and C. This will cause a similar unbalancing of the potentials across the three legs of the Y connection to the furnace F through the respective leads $100^a$, $100^b$ and $100^a$. The extra voltage across the lead $100^a$, will cause the lamp $102^a$ to glow more brightly and cause the opening of the high voltage switch 80ª, open-circuiting the lead 36ª from the Kelvin balance 50ª to the relay switch 30ª which controls the electrode raising motor switch 11ª. The Kelvin balance 50ª is therefore prevented from operating to further raise the electrode A, which further raising would increase the resistance of its arc and further unbalance the potentials across the several arcs. The Kelvin balance 50ª can operate only to lower the electrode A and thereby decrease the resistance of this arc and restore the balance of potentials of the several furnace arcs. If the unbalancing of the potentials is sufficiently great, the low voltage limit switches 90ᵇ and 90ᶜ will also open, open-circuiting the leads 34ᵇ and 34ᶜ from the Kelvin balances 50ᵇ and 50ᶜ to the relays which control the electrode lowering switches 10ᵇ and 10ᶜ, and thereby prevent the Kelvin balances 50ᵇ and 50ᶜ from lowering the electrodes B and C, which lowering would decrease the resistance of their arcs and still further unbalance the arc potentials. The Kelvin balances 50ᵇ and 50ᶜ can act only to raise the electrodes B and C and thereby increase the resistance of their arcs and restore the normal balance of the arc potentials.
When the resistance across the electrode A increases sufficiently to open the high voltage limit switch 80ª, the resistance across the arcs of electrodes B and C will usually decrease sufficiently to open up the low voltage limit switches 90ᵇ and 90ᶜ. The increase in resistance across the arc of electrode A will cause a drop in the wattage supplied to such electrode, and also, since the system is a three-phase system, will cause a decrease in the wattage supplied to electrodes B and C. If it were not for the limit switches, this decrease in wattage for the three electrodes would operate the three Kelvin balances 50ª, 50ᵇ and 50ᶜ to cause a lowering of all three of the electrodes. Since the electrode A is the only electrode out of balance, it is the only electrode which should be lowered to balance the resistance and a lowering of the electrodes B and C would be unnecessary, and if it did take place, would have to be followed by a raising of the electrodes B and C when the balance was restored. The low voltage switches 90ᵇ and 90ᶜ prevent this unnecessary lowering of the electrodes B and C because they prevent the Kelvin balances 50ᵇ and 50ᶜ from operating upon the decrease in wattage to lower the electrodes B and C. The Kelvin balance 50ª, however, is free to cause a lowering of the electrode A, which it does, until the normal wattage for the electrode A is restored. This brings the system back to a balanced condition by means of the adjustment of the electrode A, which is the only one of the three electrodes out of balance, and without disturbing the position of the electrodes B and C, the resistances of whose arcs were in proper balance.

If the potentials across the arcs become unbalanced so that the potential across the arc of electrode A is materially less than that across the arcs of the electrodes B and C, such as might occur from an abnormal decrease in the resistance of the arc of the electrode A, the reverse operation of the limit switches takes place. The lamp 102ª becomes dull and the low voltage limit switch 90ª opens, preventing the Kelvin balance from operating the electrode lowering switch 10ª and permitting regulation only to raise the electrode A. If the increase in potential across the arcs of the electrodes B and C is sufficient, the high voltage limit switches 80ᵇ and 80ᶜ will open to prevent the Kelvin balances 50ᵇ and 50ᶜ from raising the electrodes B and C and permitting only such regulation as will lower these electrodes and thereby restore a balanced voltage condition of the several furnace arcs.

When the decrease in resistance of the arc of electrode A is sufficient to operate the low voltage limit switch 90ª, such decrease in resistance will ordinarily cause a sufficient increase in resistance across the arcs from the electrodes B and C of the other two phases of the three-phase system to open the high voltage limit switches 80ᵇ and 80ᶜ. The decrease in resistance across the arc from electrode A will cause an abnormal increase in the wattage supplied to electrode A and, since the system is a three-phase system, will also cause an abnormal increase in the wattage supplied to electrodes B and C. Such increase in wattage would, if it were not for the limit switches, cause all three of the Kelvin balances to raise the three electrodes A, B and C. The raising of the electrodes B and C would, however, be unnecessary, since the resistances of their arcs are normal and the resistance of the arc of electrode A is at fault. The high voltage limit switches 90ᵇ and 90ᶜ prevent this unnecessary raising of the electrodes B and C, while the Kelvin balance 50ª is raising the electrode A to restore the resistance of its arc to normal.

For the sake of simplicity, the above explanation has been given with reference to an abnormal increase, or abnormal decrease, of the resistance of the arc from electrode A. The same operation will occur for abnormal variations in the resistances of the arcs from electrodes B or C. Also, if there should occur an abnormal change in the resistance of two electrodes, say electrodes A and B, the limit switches will prevent the adjustment of the normal electrode, namely, electrode C, while the electrodes A and B, whose resistances are out of balance, are being adjusted to restore the normal balanced condition; and as soon as one of the electrodes A or B is restored to a balanced condition, the limit switches will prevent further movement of such electrode while the remaining electrode is being adjusted to normal balance. If some abnormal condition should occur in the furnace which throws the resistances of the arcs from all three of the electrodes out of balance, the limit switches will operate in a similar way; as soon as one electrode is brought to the proper position, the limit switches will prevent further movement of such electrode, while the other two electrodes are being adjusted, and as soon as one of the remaining electrodes is properly adjusted, the limit switches will prevent further movement of it during the adjustment of the remaining or third electrode.

The limit switches prevent unnecessary hunting or see-sawing of the electrodes during the restoration of the arcs to a balanced resistance condition, thereby saving unnecessary motion and wear on the parts, and also greatly shortening the time consumed to restore the arcs to a balanced condition.

It will be seen that the motors for feeding the three electrodes, each have two controls, one a wattage control which keeps a constant and balanced wattage for the several furnace arcs, irrespective of the variations which may occur in the furnace or in the transmission line, and the other a voltage control dependent upon the relative potential drops across the several arcs in the furnace which cooperates with the wattage control to cause a selective regulation of the electrode or electrodes whose resistance is out of balance, leaving other electrodes or electrode unaffected during the restoration of balance.

The motors which operate the electrodes are provided with a stop motor drift which prevents the motors from over-running when the electrode has been raised or lowered to the proper position. This prevention of the over-running of the motor is accomplished by interrupting the feed current of the motors so that the motor operation is intermittent, the motor being energized intermittently to effect a step-by-step movement by the electrode. This intermittent movement of the motor prevents the motor from acquiring such speed and momentum as would cause it to run beyond the point at which the motor circuit is opened by the Kelvin balance when the desired regulation has been accomplished. The interrupted current applied to the motor may be full load motor current which will cause positive operation of the motor. The operation of the stop motor drift is to drive the motor with short periods of vigorous energization separated by periods of no energization in which the motor rotor is allowed to become substantially stationary.

Referring to Figure 2, the lead 20, which corresponds to the lead 20 of Figure 1, has interposed in it a make and break 110. This make and break comprises a rotating insulating cylinder 111 on which are two rings 112 and 113 which are electrically connected together. The ring 113 extends only partially around the cylinder 111. Contact with these rotatable rings is made by two stationary brushes 114 and 115 which are connected in the circuit 20. The make and break is driven by a motor 116 (see Figure 3) which drives the cylinder 111 through speed-reducing gearing 117.

The operation of this device is as follows:—The motor 116 runs continuously to drive the make and break. When the Kelvin balance 50 is in neutral position, of course no current flows through the circuit 20. Suppose, however, the Kelvin balance is actuated to bring the movable contact 39 against either of the stationary contacts 35 or 37. This causes current to flow through the circuit 20 and through one or the other of the magnets 32 or 33 to operate the corresponding motor switches and to drive the motor. As the circuit 20 is being continually interrupted by the make and break 110, the relay switch 27 or 30, which is being actuated, is likewise continually making and breaking the circuit which, in turn, causes the switches 10 or 11, as the case may be, in the feed circuit of the motor to open and close in unison with the make and break 110 to intermittently supply current to the motor. The motor 3 is therefore given a step-by-step movement and the electrode A is fed up or down by a step-by-step movement. This prevents the motor from acquiring sufficient momentum to drift past its desired stopping position when the Kelvin balance resumes its united position.

The motor control is so arranged that it may be either automatic or manual. The Kelvin balance 50 and its connections constituted the automatic control which is in operation when the switch 70 is thrown in its upward position. The manual control may be used by throwing the switch 70 in its downward position which serves to connect the three lower contacts 121, 122 and 123 to the bus bars 2$^c$, 2$^b$ and 2$^a$, respectively. The contact 121 is connected through the lead 124 directly to one of the terminals of the motor 3. The stationary contacts 122, 123 of the switch 70 are connected with the blades 131 and 132 of a double pole, double throw switch 130. The stationary contacts 133 and 134 of this switch are cross-connected and are conected with a lead 125 to the second terminal of the motor 3. The stationary contacts 135 and 136 of the switch 130 are cross-connected and are connected with the lead 126 to the third terminal of the motor 3. As can readily be seen, the motor can be driven to raise or lower the electrode by throwing the switch 130 up or down. The operator by observing the ammeters 200$^a$, 200$^b$ and 200$^c$ and the lamps 102$^a$, 102$^b$ and 102$^c$ can determine whether the electrodes should be raised or lowered. As shown in the wiring diagram, no stop motor drift is interposed in the leads to the motor from the hand control, the operator being relied upon to open the switch in sufficient time to stop the movement of the electrode at the right place. It is to be understood, however, that the stop motor drift might be employed by putting an interrupter in two of the circuits 124, 125 and 126 which feed the motor 3.

The effective work in the furnace is, of course, directly proportional to the watts, so that the constant wattage control maintains a maximum uniformity of heating and efficient furnace operation.

The automatic power control is operative whether the fluctuations are due to variations in the internal resistance of the furnace or to variable voltage in the transmission line. The true watts which are delivered to the furnace are kept constant irrespective of such variations and irrespective of variations of power factor or frequency. It is found that the regulation of the electrodes by the apparatus described results in a high degree of furnace efficiency with a high load factor and power factor, and also obtains a close and sensitive regulation.

The present invention is not limited to the use of the three electrodes in the same furnace chamber. For example, three separate furnaces or furnace chambers might be used, each having its electrode across one of the phases of the system. The electric control under such conditions will operate to maintain a balanced energy consumption of the three furnaces.

By the expression "balance condition" is not meant necessarily an equal wattage for the three electrodes, whether such three electrodes are in one furnace or are in separate furnace chambers. For example, it might be desired to draw a greater wattage from one phase of the three phase system than from the other phases. The Kelvin balances can be so adjusted that a predetermined wattage, whether the same or different, may be maintained for each of the phases of the system.

The term "resistance", as employed in the claims, is intended as a term of general definition and not of limitation, and to include both ohmic and inductive resistance.

While it is preferred, particularly in the case of an electric arc furnace, to vary the resistance of the circuit by varying the length of the arc, resistance in the circuit might be otherwise varied, as for example, by an adjustable rheostat or reactance.

The regulation herein described is not limited to its application to the electric furnace but may be employed for other purposes. For example, the power consumed by an electric motor may be maintained constant or regulated as to load, or the regulation may be employed in combined electrical or mechanical devices such, for example, as the regulation of the pressure on a motor driven grinder which it is desirable to maintain at a constant or controlled load. Devices for preventing a motor from overrunning its desired stopping position are described and claimed in our copending applications for electric motor control cases, Serial Nos. 292,283 and 292,284 filed of even date herewith.

The present invention is, therefore, not limited to its preferred embodiment but may be embodied in other forms of apparatus or employed for other purposes within the scope of the following claims.

We claim:

1. The combination with a device for consuming or transforming electrical energy, of a watt-actuated device and means controlled thereby for automatically regulating the current consumption in accordance with the wattage, a manual control for regulating the current, and means for shifting at will from the automatic to the manual control, or vice versa; substantially as described.

2. The combination with a device for consuming or transforming electrical energy, of means for regulating the energy consumption, and means dependent upon the electrical conditions of the device for preventing the operation of the regulating means under certain predetermined conditions, substantially as described.

3. The combination with a device for consuming or transforming electrical energy, of means for regulating the energy consumption, and means controlled by the potential drop across the device for preventing the operation of the regulating means upon a certain variation of the potential drop, substantially as described.

4. The combination with a plurality of current-using units, of means for regulating the energy consumption of the several units to maintain a predetermined energy distribution among them, and means controlled by the internal electrical conditions of the several units for preventing the operation of the regulating means on a normal unit or units during the restoration of the abnormal unit or units, substantially as described.

5. The combination with a plurality of current-using units, of means for separately regulating the energy consumption of the several units, and means controlled by the voltage drops over the several units for preventing the regulating means of a unit from operating upon a certain variation of such voltage drops, substantially as described.

6. The combination with a plurality of current-using units, of means for regulating the energy consumption of the several units to maintain a predetermined energy distribution among them, and means controlled by the voltage drops over the several units and cooperating with the regulating means to prevent the regulating means from disturbing a normal unit or units, while permitting restoration of the abnormal unit or units, substantially as described.

7. The combination with a current-using unit, of means for regulating the current to such unit, and means for preventing the operation of the regulating means upon predetermined variations of the voltage, including two limit switches, one operating upon an increase in voltage above a predetermined point and the other operated upon a decrease in voltage below a predetermined point, substantially as described.

8. The combination in an electric arc furnace, of an electrode and means for adjusting the position of the electrode, and means controlled by the potential drop across the arc for preventing the operation of the electrode-adjusting means upon a predetermined variation in such voltage, substantially as described.

9. The combination with an electric arc furnace, having three electrodes supplied with a three-phase current, of means for regulating the positions of the electrodes in the furnace to vary the resistance of the several arcs, and means controlled by the voltage drops across the several arcs for preventing the operation of the electrode-regulating means upon certain predetermined voltage variations, substantially as described.

10. The method of operating a plurality of current using units, which consist in separately regulating the energy consumption of the several units and in simultaneously maintaining a substantially equal voltage drop across the several units, substantially as described.

11. The combination with a plurality of electric furnace electrodes, of means for adjusting the position of the electrodes so as to maintain a predetermined energy distribution among the several electrodes, and means controlled by the potential drop across the arcs for preventing the disturbing of a normal electrode or electrodes while permitting the restoration of the abnormal electrode or electrodes, substantially as described.

12. The combination with three electric furnace electrodes supplied by a three-phase electric system, of means for regulating the positions of the electrodes to vary the resistances of the several arcs, and cooperating means for preventing unnecessary movement of a normal electrode or electrodes while permitting the adjustment of an abnormal electrode or electrodes, substantially as described.

13. In an electric furnace, the combination with a source of electric energy, of a plurality of circuits and a plurality of electrodes, and an automatic controlling mechanism for maintaining such resistance in each circuit as will cause all the electrodes to deliver energy at a predetermined rate and each electrode to deliver its proportion thereof, substantially as described.

14. In an electric furnace, the combination of a plurality of power circuits and a plurality of electrodes arranged to deliver energy to the charge in the furnace across a resistance between electrode and charge, and means for maintaining such resistance between each electrode and charge as will cause all the electrodes to deliver energy at a predetermined rate and each electrode to deliver its proportion thereof, substantially as described.

15. In an electric furnace, the combination of a plurality of power circuits and a plurality of electrodes, said electrodes being so positioned with respect to the charge as to provide a resistance across which the energy is delivered, and a controlling mechanism including means for varying the relative position of the electrodes and charge and thus maintaining such resistance as will cause all the electrodes to deliver energy at a predetermined rate and each electrode to deliver its proportion thereof, said controlling mechanism being thrown into operation by any variation in the power delivered, substantially as described.

16. In an electric furnace, the combination of a source of electric energy, a circuit including a plurality of electrodes for delivering the energy flowing through the circuit to the furnace, and a control mechanism including an element rendered effective by change of potential of the energy delivered by an electrode, and an element rendered effective by change in wattage, said control mechanism causing all of said electrodes to deliver energy at a predetermined rate and each electrode to deliver a definite proportion thereof, substantially as described.

17. In an apparatus for delivering electrical energy, the combination of a source of said energy, a circuit through which said energy flows, and a control mechanism for regulating, by adjustment of resistance, the flow of energy, said mechanism including an element rendered effective by changes in potential, and a second element rendered effective by changes in wattage, substantially as described.

18. In an electric furnace, the combination with a plurality of electrodes, of a shifting mechanism including a motor for each electrode, whereby the electrodes may be independently shifted to adjust the resistance between the electrodes and charge, circuit connections whereby said motors may be operated in either direction, a controlling mechanism for said circuits sensitive to changes in wattage or in the potential effected by the resistance between the electrodes and the charge, whereby a change in the potential or a change in wattage causes the motors to operate to adjust the resistance, substantially as described.

19. The method of regulating a current electrical power-consuming or transforming device, which consists in maintaining a substantially constant wattage consumption under varying line voltage conditions, substantially as described.

20. The method of regulating an alternating current electrical power-consuming or transforming device, which consists in maintaining a substantially constant wattage consumption under varying line voltage, power factor or frequency conditions, substantially as described.

21. The method of regulating an electrical power-consuming and transforming device, which consists in varying the current in accordance with the wattage consumption so as to maintain a substantially constant wattage consumption under varying line voltage conditions, substantially as described.

22. The method of regulating an alternating current electrical power-consuming and transforming device, which consists in varying the current in accordance with the wattage consumption so as to maintain a substantially constant wattage consumption under varying line voltage, power factor or frequency conditions, substantially as described.

23. The method of regulating an electric furnace, which consists in varying resistance in a furnace circuit in accordance with the wattage consumption under varying line voltage conditions so as to maintain a substantially constant wattage consumption, substantially as described.

24. The method of regulating an alternating current electric furnace, which consists in varying the resistance of a furnace circuit in accordance with the wattage consumption under varying line voltage, power factor or frequency conditions so as to maintain a substantially constant wattage consumption, substantially as described.

25. The method of regulating an electric arc furnace having a plurality of electrodes and circuits therefor, which consists in controlling each circuit in accordance with the wattage consumption so as to cause each electrode to deliver energy at a predetermined rate and each electrode to deliver its proportion thereof, substantially as described.

26. The method of regulating an electric furnace having a plurality of electrodes and circuits therefor which consists in controlling the energy delivered to each circuit so as to maintain a substantially uniform delivery by each electrode combined with a balanced distribution of energy between the electrodes, substantially as described.

27. The combination with a device for consuming and transforming power, of an automatic regulator responsive to variations in the wattage consumption and operating to maintain a substantially constant wattage consumption under varying line voltage conditions, substantially as described.

28. The combination with a device for consuming or transforming alternating electric current, of a regulator actuated in accordance with the wattage consumption and operating to maintain a substantially constant wattage consumption under varying line voltage, power factor or frequency conditions, substantially as described.

29. The combination with an electric furnace having a heating circuit, of means actuated in accordance with the wattage consumption of such circuit for varying the resistance of the circuit in accordance with the wattage consumption so as to maintain a substantially constant wattage consumption for varying line voltage conditions, substantially as described.

30. The combination with an electric furnace having a plurality of electrodes and circuits therefor, of automatic means for controlling the energy delivery to the several circuits in accordance with the wattage consumption thereof so as to cause all the electrodes to deliver energy at a predetermined rate and each electrode to deliver its proportion thereof, substantially as described.

31. The combination with an electric furnace having a heating circuit, of an automatic regulator of the Kelvin balance type and responsive to variations in the wattage consumption of such circuit for maintaining a substantially constant wattage consumption, substantially as described.

32. The combination with an electric furnace having a heating circuit, of an automatic regulator comprising coacting current and voltage coils having a substantially iron-free magnetic field and responsive to variations in the wattage consumption of such circuit for maintaining a substantially constant wattage consumption, substantially as described.

33. The combination with an electric furnace having a heating circuit, of an automatic regulator comprising relatively movable coacting current and voltage coils and responsive to variations in the wattage consumption of such circuit for maintaining a substantially constant wattage consumption, substantially as described.

34. The combination with an electric furnace having a heating circuit, of an automatic regulator comprising relatively movable co-acting current and voltage coils having a substantially iron-free magnetic field and responsive to variations in the wattage consumption of such circuit for maintaining a substantially constant wattage consumption, substantially as described.

35. The combination with a device for consuming or transforming electric power, of a regulator comprising co-acting current and voltage coils having a substantially iron-free magnetic field and responsive to variations in the wattage consumption for maintaining a substantially constant wattage consumption, substantially as described.

36. The combination with a device for consuming or transforming electric power, of an automatic regulator comprising relatively movable co-acting current and voltage coils and responsive to variations in the wattage consumption for maintaining a substantially constant wattage consumption, substantially as described.

In testimony whereof, we have hereunto set our hands.

BYRAMJI D. SAKLATWALLA.
ARTHUR N. ANDERSON.